United States Patent Office.

ARMAND JULIUS STIEGELMANN, OF LUDWIGSHAFEN, GERMANY, ASSIGNOR TO THE BADISCHE ANILIN AND SODA FABRIK, OF SAME PLACE.

STABLE INDIGO-WHITE AND PROCESS OF MAKING SAME.

SPECIFICATION forming part of Letters Patent No. 657,320, dated September 4, 1900.

Application filed May 21, 1900. Serial No. 17,472. (Specimens.)

*To all whom it may concern:*

Be it known that I, ARMAND JULIUS STIEGELMANN, doctor of philosophy, a subject of the Emperor of Germany, residing at Ludwigshafen-on-the-Rhine, in the Kingdom of Bavaria and Empire of Germany, have invented new and useful Improvements in Stable Indigo-White Compounds, of which the following is a specification.

My invention relates to the production of a new indigo-white compound which is stable in the presence of air, but which can readily be converted into indigo-white or its salts.

The new compound can be used for the production of indigo-white on the fiber, and it is particularly suited for use in printing.

My new compound is produced by treating indigo-white with formaldehyde, and the treatment must be effected in neutral solution or suspension in order that the desired product may be smoothly obtained. If the treatment be effected in acid solution, a mixture is obtained containing amorphous product soluble in alcohol and a crystallized portion which is more difficultly soluble in alcohol. If an alkaline solution of indigo-white be treated with formaldehyde and then precipitated with excess of hydrochloric acid, (compare French Patent No. 287,894,) an impure mixed product is obtained, and my new product can only be prepared from this mixture by special treatment in small quantities, so that this method of obtaining my product is not recommended. The analysis of my new body has shown it to have an empirical formula corresponding to $C_{18}H_{16}O_4N_2$, which is the formula of hydroxy-methylene-indigo-white.

The following example will show how my invention may be carried into practical effect and the new product obtained: Suspend about twenty-six and a half $(26\frac{1}{2})$ parts of indigo-white in two hundred (200) parts of water and about thirty (30) parts of a forty-per-cent. solution of formaldehyde. Agitate the mixture thoroughly at the ordinary temperature until all the indigo-white has disappeared. The new compound separates out as a more or less greenish precipitate. Collect by filtering, wash with water, and dry. The drying may be effected without exclusion of air in the usual way.

The new compound is difficultly soluble in water and cold alcohol, insoluble in ether and benzene, but readily soluble in acetone and hot glacial acetic acid. It can be recrystallized from hot alcohol, yielding greenish yellow foliate crystals. Upon treatment with caustic alkalies or with the alkaline earths at the ordinary temperature or on boiling with water my new compound is reconverted into indigo-white or its salts.

Instead of suspending the indigo-white in water other diluents or solvents can be used—for instance, alcohol.

Now what I claim is—

1. The process for the manufacture of a new indigo-white body, by treating indigo-white in a neutral medium with formaldehyde, substantially as described.

2. As a new product, the body which can be obtained by treating indigo-white in water with formaldehyde and which body has an empirical composition corresponding to that of hydroxy-methylene-indigo-white, which is stable in the presence of air and on treatment with caustic-soda solution in the presence of air yields indigo.

In testimony whereof I have hereunto set my hand in the presence of two subscribing witnesses.

ARMAND JULIUS STIEGELMANN.

Witnesses:
ERNEST F. EHRHARDT,
J. L. HEINKE.